United States Patent
Nukushina

(10) Patent No.: US 8,162,015 B2
(45) Date of Patent: Apr. 24, 2012

(54) PNEUMATIC TIRE HAVING ASYMMETRICAL TREAD PATTERN

(75) Inventor: Ryousuke Nukushina, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/995,203

(22) PCT Filed: Jul. 30, 2009

(86) PCT No.: PCT/JP2009/063552
§ 371 (c)(1),
(2), (4) Date: Nov. 30, 2010

(87) PCT Pub. No.: WO2010/058627
PCT Pub. Date: May 27, 2010

(65) Prior Publication Data
US 2011/0067793 A1 Mar. 24, 2011

(30) Foreign Application Priority Data

Nov. 18, 2008 (JP) ................................. 2008-294945

(51) Int. Cl.
*B60C 11/03* (2006.01)
*B60C 11/12* (2006.01)
(52) U.S. Cl. ............ 152/209.8; 152/209.15; 152/DIG. 3
(58) Field of Classification Search ................ 152/209.8, 152/209.9, 209.15, 209.18, DIG. 3; D12/515–532
See application file for complete search history.

(56) References Cited

U.S. PATENT DOCUMENTS 4,387,754 A * 6/1983 Mirtain et al. ............. 152/209.1
(Continued)

FOREIGN PATENT DOCUMENTS

DE          3625120     *   1/1988
(Continued)

OTHER PUBLICATIONS

Machine translation for WO 2007/028442 (no date).*
(Continued)

*Primary Examiner* — Steven D Maki
(74) *Attorney, Agent, or Firm* — Carrier Blackman & Associates, P.C.; William D. Blackman; Joseph P. Carrier

(57) ABSTRACT

Provided is a pneumatic tire capable of improving the drainage performance while favorably maintaining the uneven wear resistance. The pneumatic tire of the present invention is a pneumatic tire having a tread portion provided with at least three main grooves extending in a tire circumferential direction, these main grooves defining a plurality of land portions, the pneumatic tire characterized in that, when specified are a pair of the land portions positioned respectively at both sides of any one of the main grooves excluding the main grooves on outermost sides in a tire width direction, a plurality of first inclined grooves inclined to the tire circumferential direction are provided in one land portion of the pair of the land portions, and a plurality of second inclined grooves inclined in a same direction as that of the first inclined grooves are provided in the other land portion of the pair of the land portions, each of the first inclined grooves is opened at one end to the main groove positioned between the pair of the land portions, and is terminated at the other end in the one land portion, and each of the second inclined grooves is opened at one end to the main groove positioned between the pair of the land portions, and is terminated at the other end in the other land portion.

11 Claims, 4 Drawing Sheets

U.S. PATENT DOCUMENTS

| | | | |
|---|---|---|---|
| 4,416,317 A | 11/1983 | Caretta | |
| 6,112,787 A | 9/2000 | Fukumoto et al. | |
| 6,315,018 B1 * | 11/2001 | Watanabe | 152/DIG. 3 |
| D524,234 S * | 7/2006 | Schmalix et al. | D12/521 |
| 7,322,391 B2 * | 1/2008 | Metz | 152/209.18 |
| D582,839 S * | 12/2008 | Lee et al. | D12/530 |
| D602,846 S * | 10/2009 | Park et al. | D12/519 |
| 2004/0069389 A1 * | 4/2004 | Ratliff, Jr. | 152/209.15 |
| 2006/0137791 A1 | 6/2006 | Miyabe et al. | |
| 2007/0272337 A1 * | 11/2007 | Bovaird et al. | 152/DIG. 3 |
| 2010/0212796 A1 | 8/2010 | Iwabuchi | |

FOREIGN PATENT DOCUMENTS

| | | | |
|---|---|---|---|
| JP | 56-031805 A | | 3/1981 |
| JP | 57-121903 A | | 7/1982 |
| JP | 9-272311 A | | 10/1997 |
| JP | 10-071811 A | | 3/1998 |
| JP | 63-159112 A | * | 7/1998 |
| JP | 2003-146024 | * | 5/2003 |
| JP | 2004-017863 A | | 1/2004 |
| JP | 2004-262312 A | | 9/2004 |
| JP | 2006-123706 A | | 5/2006 |
| JP | 2006-347346 A | | 12/2006 |
| JP | 2007-237805 A | | 9/2007 |
| JP | 2009-067173 A | | 4/2009 |
| JP | 2009-149124 A | | 7/2009 |
| JP | 2009-202772 A | | 9/2009 |
| WO | 2006/059560 A1 | | 6/2006 |
| WO | 2007/028442 | * | 3/2007 |

OTHER PUBLICATIONS

Machine translation for German 3,625,120 (no date).*
Machine translation for Japan 2003-146024 (no date).*

* cited by examiner

PNEUMATIC TIRE HAVING ASYMMETRICAL TREAD PATTERN

TECHNICAL FIELD

The present invention relates to a pneumatic tire including main grooves extending in a tire circumferential direction in a tread portion thereof. More specifically, the present invention relates to a pneumatic tire capable of achieving a good balance between drainage performance and uneven wear resistance.

A pneumatic tire generally includes main grooves extending in a tire circumferential direction in a tread portion thereof. These main grooves have such a relatively large area that the drainage performance is guaranteed. Moreover, multiple lug grooves, extending in a tire width direction, are provided in the tread portion. When these lug grooves communicate with the main grooves, the drainage performance can be further increased.

However, when land portions defined by the main grooves are partitioned into a number of blocks by lug grooves, there is a drawback that uneven wearing is likely to occur in these blocks. Against this, it is proposed that multiple inclined grooves are provided in an intermediate land portion positioned between a central land portion and a shoulder land portion, and that each of the inclined grooves is opened at one end to the main groove on the outer side in the tire width direction and is terminated at the other end in the intermediate land portion (see, for example, Patent Documents 1 to 4).

When such an inclined groove having one end closed is provided in an intermediate land portion positioned between a central land portion and a shoulder land portion, it is possible to suppress the occurrence of uneven wearing; however, the effect of improving the drainage performance is not always sufficiently obtained at present.

PRIOR ART DOCUMENT

Patent Document

Patent Document 1: Japanese patent application Kokai publication No. 2004-262312
Patent Document 2: Japanese patent application Kokai publication No. 2004-17863
Patent Document 3: Japanese patent application Kokai publication No. 2006-123706
Patent Document 4: International Patent Application Publication No. WO2006/059560

SUMMARY OF THE INVENTION

Problem to be Solved by the Invention

An object of the present invention is to provide a pneumatic tire capable of improving the drainage performance while favorably maintaining the uneven wear resistance.

Means for Solving the Problem

In order to achieve the above object, a pneumatic tire of the present invention is characterized as follows. Specifically, the pneumatic tire is a pneumatic tire having a tread portion provided with at least three main grooves extending in a tire circumferential direction, these main grooves defining a plurality of land portions, the pneumatic tire characterized in that when specified are a pair of the land portions positioned respectively at both sides of any one of the main grooves excluding the main grooves on outermost sides in a tire width direction, a plurality of first inclined grooves inclined to the tire circumferential direction are provided in one land portion of the pair of the land portions, and a plurality of second inclined grooves inclined in a same direction as that of the first inclined grooves are provided in the other land portion of the pair of the land portions, each of the first inclined grooves is opened at one end to the main groove positioned between the pair of the land portions, and is terminated at the other end in the one land portion, and each of the second inclined grooves is opened at one end to the main groove positioned between the pair of the land portions, and is terminated at the other end in the other land portion.

More preferably, in order to achieve the above object, a pneumatic tire of the present invention is characterized as follows. Specifically, the pneumatic tire is a pneumatic tire having an asymmetrical tread pattern with respect to both sides of a tire equator line, and designed to be mounted on a vehicle in away that a designated side of the tire faces to an outside of the vehicle, the pneumatic tire characterized in that at least four main grooves extending in a tire circumferential direction are provided in a tread portion, a plurality of land portions are defined by these main grooves, a plurality of first inclined grooves inclined to the tire circumferential direction are provided in a central land portion positioned on the tire equator line, a plurality of second inclined grooves inclined in a same direction as that of the first inclined grooves are provided in an inner side-intermediate land portion positioned on an inner side of the vehicle relative to the central land portion, each of the first inclined grooves is opened at one end to the main groove positioned between the central land portion and the inner side-intermediate land portion, and is terminated at the other end in the central land portion, and each of the second inclined grooves is opened at one end to the main groove positioned between the central land portion and the inner side-intermediate land portion, and is terminated at the other end in the inner side-intermediate land portion.

Effects of the Invention

In the present invention, when specified are the pair of the land portions positioned respectively at both sides of any one of the main grooves excluding the main grooves on outermost sides in the tire width direction, the first inclined grooves having one end closed are provided in one land portion of the pair of the land portions, while the second inclined grooves having one end closed and inclined in a same direction as that of the first inclined grooves are provided in the other land portion of the pair of the land portions. In addition, each of the first inclined grooves and the second land portion is opened at one end to the common main groove positioned between the pair of the land portions. Such a main groove is positioned at a portion which is closer to a tire equator line than the main grooves on the outermost sides in the tire width direction are, and which has a relatively long footprint length in a tire circumferential direction. Accordingly, when the first inclined grooves and the second inclined grooves are communicated with the main groove, the drainage performance is effectively increased, while the uneven wear resistance is favorably maintained.

Here, it is preferable that an average inclination angle α of a profile line of the first inclined groove with respect to the tire circumferential direction, the profile line making an acute angle with an edge of the one land portion, and an average inclination angle β of a profile line of an second inclined groove with respect to the tire circumferential direction, the profile line making an acute angle with an edge of the other land portion, are 20° to 50°. By setting the average inclination angles α, β of the first inclined groove and the second inclined groove to be smaller than the respective upper limit values, the drainage performance is improved. Additionally, by setting the average inclination angles α, β to be greater than the respective lower limit values, the uneven wear resistance is improved.

An inclination angle of the profile line of the first inclined groove with respect to the tire circumferential direction gradually decreases from an opening end of the first inclined groove to at least a central position therein in a groove length direction, the profile line making an acute angle with the edge of the one land portion. In addition, an inclination angle of the profile line of the second inclined groove with respect to the tire circumferential direction gradually decreases from an opening end of the second inclined groove to at least a central position therein in a groove length direction, the profile line making an acute angle with the edge of the other land portion. Accordingly, a superb drainage performance is demonstrated.

A shortest distance γ1 to the first inclined groove from an edge on an opposite side of the one land portion to the edge where the first inclined groove is opened is 10% to 40% of a width of the one land portion. In addition, a shortest distance γ2 to the second inclined groove from an edge on an opposite side of the other land portion to the edge where the second inclined groove is opened is 10% to 40% of a width of the other land portion. By setting the shortest distances γ1, γ2 of the first inclined groove and the second inclined groove to be smaller than the respective upper limit values, the drainage performance is improved. Additionally, by setting the shortest distances γ1, γ2 to be greater than the respective lower limit values, the uneven wear resistance is improved.

Each of the land portions provided with the first inclined grooves or the second inclined grooves is preferably provided with multiple chamfered portions at the edge on an opposite side of the land portion to the edge where the first inclined groove or the second inclined grooves is opened. Accordingly, the uneven wear resistance is improved. Here, in order to obtain the effect of improving the uneven wear resistance sufficiently, it is preferable that: the maximum width of each of the chamfered portions be set to 10% to 30% of the width of the land portion; the maximum depth of the chamfered portion be set to 10% or more of the effective depth from a road-contacting surface to a wear indicator of the main groove; and the maximum width portion of the chamfered portion be disposed between a dead end of one of a pair of the inclined grooves neighboring in the tire circumferential direction and an opening end of the other of the pair.

Furthermore, in the present invention, attention has been focused on a pneumatic tire having an asymmetrical tread pattern with respect to both sides of a tire equator line, and designed to be mounted on a vehicle in a way that a designated side of the tire faces to an outside of the vehicle. The balance between the uneven wear resistance and the drainage performance is achieved by diligent combination of the mounting orientations and the arrangement of inclined grooves in such a pneumatic tire.

Specifically, in a pneumatic tire having an asymmetrical tread pattern with respect to both sides of a tire equator line, and designed to be mounted on a vehicle in a way that a designated side of the tire faces to an outside of the vehicle, first inclined grooves having one end closed are provided in a central land portion, while second inclined grooves having one end closed and being inclined in the same direction as that of the first inclined grooves are provided in an inner side-intermediate land portion. Each of the first inclined grooves and the second inclined grooves is opened at one end to the common main groove positioned between the central land portion and the inner side-intermediate land portion. Accordingly, while the uneven wear resistance is favorably maintained, the drainage performance is effectively increased.

Here, it is preferable that an average inclination angle α of a profile line of the first inclined groove with respect to the tire circumferential direction is 30° to 50°, the profile line making an acute angle with an edge of the central land portion, and an average inclination angle β of a profile line of the second inclined groove with respect to the tire circumferential direction is 20° to 40°, the profile line making an acute angle with an edge of the inner side-intermediate land portion. By setting the average inclination angles α, β of the first inclined groove and the second inclined groove to be smaller than the respective upper limit values, the drainage performance is improved. Additionally, by setting the average inclination angles α, β to be greater than the respective lower limit values, the uneven wear resistance is improved.

the average inclination angle α of the profile line of the first inclined groove with respect to the tire circumferential direction and the average inclination angle β of the profile line of the second inclined groove with respect to the tire circumferential direction preferably have a relationship of α>β, the profile line of the first inclined groove making an acute angle with the edge of the central land portion, the profile line of the second inclined groove making an acute angle with the edge of the inner side-intermediate land portion. Accordingly, while the rigidity of the central land portion is guaranteed, the drainage performance is improved.

It is preferable that an inclination angle of the profile line of the first inclined groove with respect to the tire circumferential direction gradually decreases from an opening end of the first inclined groove to at least a central position therein in a groove length direction, the profile line making an acute angle with the edge of the central land portion, and an inclination angle of the profile line of the second inclined groove with respect to the tire circumferential direction gradually decreases from an opening end of the second inclined groove to at least a central position therein in a groove length direction, the profile line making an acute angle with the edge of the inner side-intermediate land portion. Accordingly, a superb drainage performance is demonstrated.

A shortest distance γ1 to the first inclined groove from an edge on an opposite side of the central land portion to the edge where the first inclined groove is opened is preferably 10% to 40% of a width of the central land portion. In addition, a shortest distance γ2 to the second inclined groove from an edge on an opposite side of the inner side-intermediate land portion to the edge where the second inclined groove is opened is preferably 10% to 40% of a width of the inner side-intermediate land portion. By setting the shortest distances γ1, γ2 of the first inclined groove and the second inclined groove to be smaller than the respective upper limit values, the drainage performance is improved. Additionally, by setting the shortest distances γ1, γ2 to be greater than the respective lower limit values, the uneven wear resistance is improved.

Multiple chamfered portions are preferably provided at the edge, at an outer side of the vehicle, of the central land portion. Accordingly, the uneven wear resistance is improved. Here, in order to obtain the effect of improving the uneven wear resistance sufficiently, it is preferable that: the maximum width of the chamfered portion be set to 10% to 30% of the width of the central land portion; the maximum depth of the chamfered portion be set to 10% or more of the effective depth from a road-contacting surface to a wear indicator of the main groove; and the maximum width portion of the chamfered portion be disposed between a dead end of one of a pair of the first inclined grooves neighboring in the tire circumferential direction and an opening end of the other of the pair.

An outer side-intermediate land portion positioned on the outer side of the vehicle relative to the central land portion preferably has a rib structure in which the outer side-intermediate land portion is continuous in the tire circumferential direction. This compensates a lowered rigidity attributable to the first inclined grooves and the second inclined grooves that are provided to improve the drainage performance. Consequently, the cornering performance is improved.

It is preferable that a plurality of lug grooves extending in the tire width direction are provided in the outer side-shoulder land portion positioned on the outer side of the vehicle, and these lug grooves communicate with the main groove adjacent to the outer side-shoulder land portion. Accordingly, the drainage capability of the main groove adjacent to the outer side-shoulder land portion is increased, and thereby the drainage performance of the entire tread is improved.

It is preferable that a plurality of lug grooves extending in the tire width direction are provided in an inner side-shoulder land portion positioned on the inner side of the vehicle, and these lug grooves do not communicate with the main groove adjacent to the inner side-shoulder land portion. Since heel-and-toe wear is likely to occur in the inner side-shoulder land portion positioned on the inner side of the vehicle, the lug grooves are made not to communicate with the main groove adjacent to the inner side-shoulder land portion. Accordingly, the uneven wear resistance is improved.

BEST MODES FOR CARRYING OUT THE INVENTION

Figure 1:
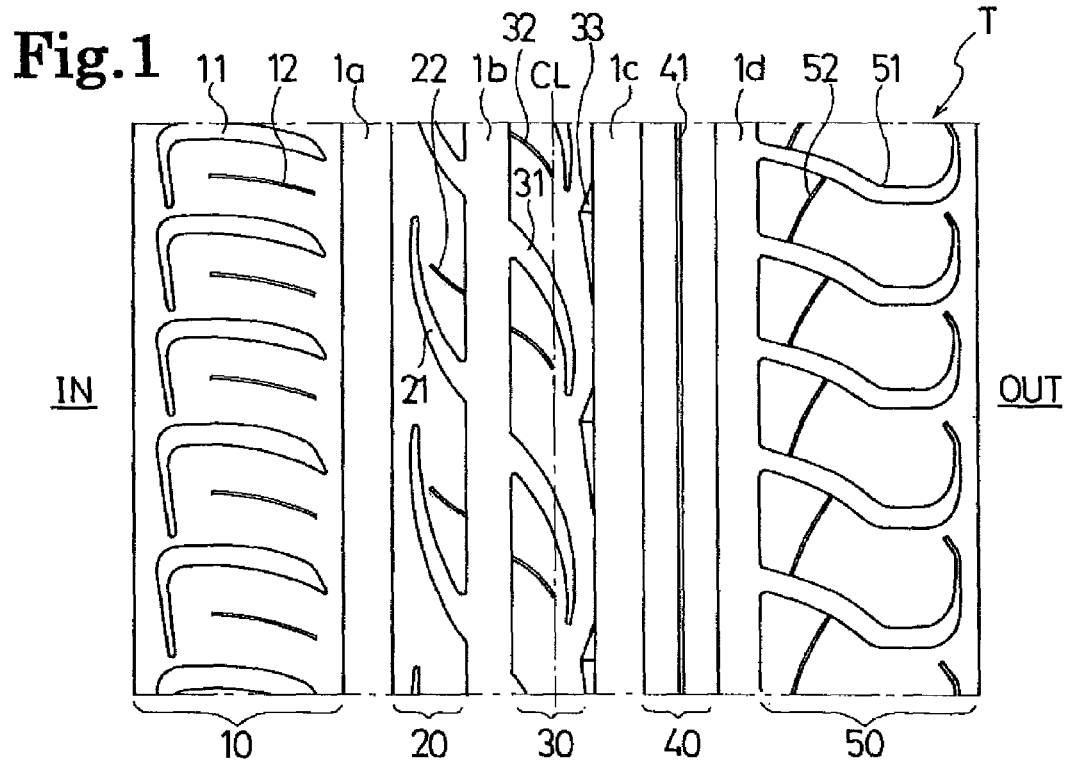
FIG. 1 is a developed view showing a tread pattern of a pneumatic tire in an embodiment of the present invention.
Figure 2:
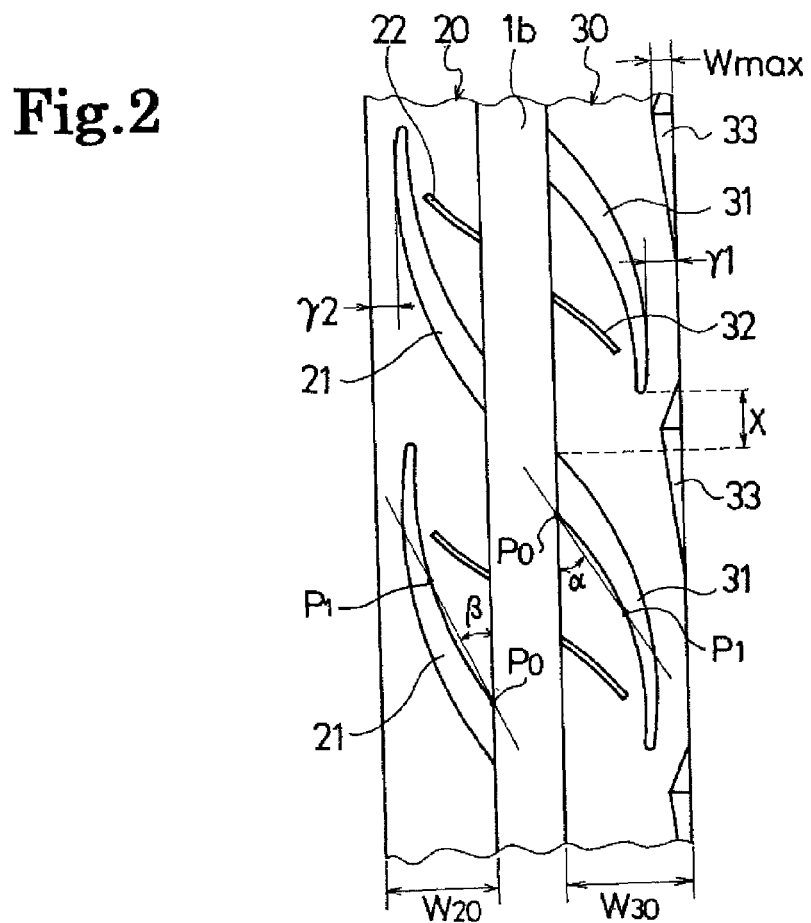
FIG. 2 is an enlarged plan view showing a central land portion and an inner side-intermediate land portion in FIG. 1.
Figure 3:
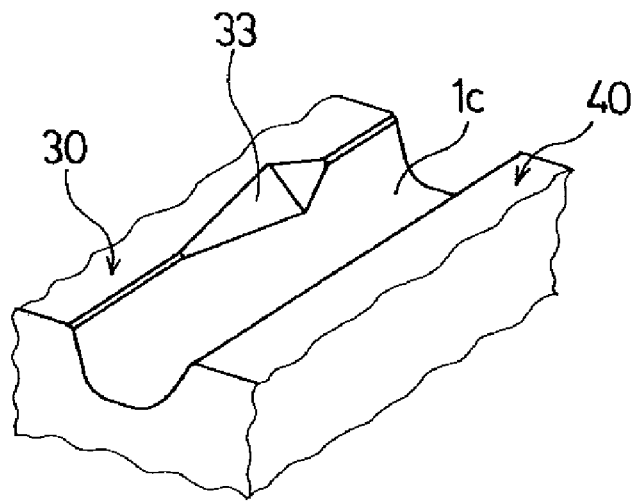
FIG. 3 is a perspective view showing a principal portion of the central land portion.
Figure 4:
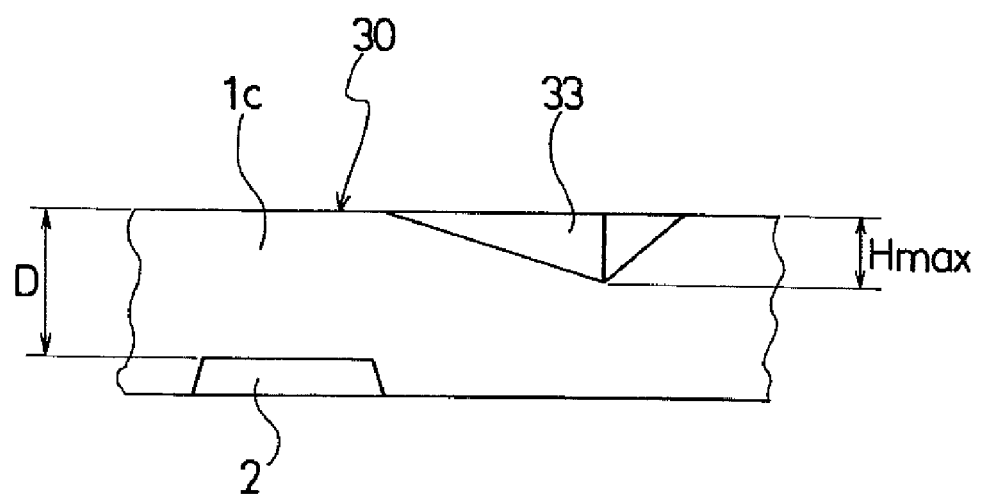
FIG. 4 is a side view showing the principal portion of the central land portion.

Hereinafter, the structure of the present invention will be described specifically with reference to the accompanying drawings. FIG. 1 shows a tread pattern of a pneumatic tire in an embodiment of the present invention. FIG. 2 shows a central land portion and an inner side-intermediate land portion in FIG. 1. FIG. 3 and FIG. 4 each show a principal portion of the central land portion. The pneumatic tire of this embodiment is designed to be mounted on a vehicle in a way that a designated side of the tire faces to an outside of the vehicle. The outer side of the vehicle is indicated by OUT, while the inner side of the vehicle is indicated by IN.

As shown in FIG. 1, four main grooves 1a, 1b, 1c, 1d are sequentially formed in a tread portion T from the inner side of the vehicle to the outer side of the vehicle, and extend in a tire circumferential direction. Five land portions 10, 20, 30, 40, 50 are defined by these main grooves 1a to 1d. Specifically, the inner side-shoulder land portion 10 is positioned in a shoulder region on the inner side of the vehicle; the inner side-intermediate land portion 20 is positioned between the main grooves 1a, 1b; the central land portion 30 is positioned on a tire equator line CL and between the main grooves 1b, 1c; the outer side-intermediate land portion 40 is positioned between the main grooves 1c, 1d; and the outer side-shoulder land portion 50 is positioned in a shoulder region on the outer side of the vehicle. Note that the widths of the main grooves 1a to 1d are 5.0 mm to 15.0 mm, and the depths thereof are 7.5 mm to 9.0 mm.

In the central land portion 30, multiple inclined grooves (first inclined grooves) inclined to the tire circumferential direction are formed at certain intervals in the tire circumferential direction. Each of the inclined grooves 31 is opened at one end to the main groove 1b positioned between the central land portion 30 and the inner side-intermediate land portion 20, and is terminated at the other end in the central land portion 30. The width of each inclined groove 31 may be uniform, but desirably the width becomes narrower toward the dead end as illustrated. Moreover, multiple sipes 32 communicating only with the main groove 1b are formed in the central land portion 30. The inclined grooves 31 and the sipes 32 are alternately disposed along the tire circumferential direction. Furthermore, in the central land portion 30, multiple chamfered portions 33 are formed at an edge on the outer side of the vehicle. Each of the chamfered portions 33 has a pair of inclined surfaces that forms a triangle. Each chamfered portion 33 is disposed to be positioned between a pair of the inclined grooves 31, 31 neighboring in the tire circumferential direction.

In the inner side-intermediate land portion 20, multiple inclined grooves 21 (second inclined grooves) inclined in the same direction as that of the inclined grooves 31 are formed at certain intervals in the tire circumferential direction. Each of the inclined grooves 21 is opened at one end to the main groove 1b positioned between the central land portion 30 and the inner side-intermediate land portion 20, and is terminated at the other end in the inner side-intermediate land portion 20. The width of each inclined groove 21 may be uniform, but desirably the width becomes narrower toward the dead end as illustrated. Moreover, multiple sipes 22 communicating only with the main groove 1b are formed in the inner side-intermediate land portion 20. The inclined grooves 21 and the sipes 22 are alternately disposed along the tire circumferential direction.

In the outer side-intermediate land portion 40, a sub groove 41 is formed and extends in the tire circumferential direction. The sub groove 41 has a width of 1.0 mm to 3.0 mm and a depth of 1.0 mm to 2.5 mm, and thus is formed more shallowly and narrowly than the main grooves 1a to 1d. The outer side-intermediate land portion 40 is not cut across with a groove extending in a tire width direction, and has such a rib structure that the outer side-intermediate land portion 40 is continuous in the tire circumferential direction.

In the inner side-shoulder land portion 10, multiple lug grooves 11 extending in the tire width direction and multiple sipes 12 extending in the tire width direction are formed. The lug grooves 11 and the sipes 12 are alternately disposed at certain intervals in the tire circumferential direction. None of the lug grooves 11 and the sipes 12 communicate with the main groove 1a adjacent to the inner side-shoulder land portion 10.

In the outer side-shoulder land portion 50, multiple lug grooves 51 extending in the tire width direction are formed at certain intervals in the tire circumferential direction. These lug grooves 51 communicate with the main groove 1d adjacent to the outer side-shoulder land portion 50. Moreover, multiple sipes 52 are formed in the outer side-shoulder land portion 50 in such a manner that each sipe 52 straddles a pair of the lug grooves 51, 51 neighboring in the tire circumferential direction.

In the pneumatic tire having the above-described tread pattern, the inclined grooves 31 having one end closed are provided in the central land portion 30, while the inclined grooves 21 having one end closed and being inclined in the same direction as that of the inclined grooves 31 are provided in the inner side-intermediate land portion 20. One end of each of these inclined grooves 21, 31 is opened to the common main groove 1d positioned between the central land portion 30 and the inner side-intermediate land portion 20. Accordingly, the drainage performance is effectively increased. Particularly, the inclined grooves 21 and the inclined grooves 31 are arranged in such a substantially point-symmetrical manner that the opening ends of the inclined grooves 21 face the opening ends of the inclined grooves 31. This enables the drainage capability based on the main groove 1d to increase. Moreover, since the inclined grooves 21, 31 do not cut across the land portions 20, 30, the uneven wear resistance is also superb. Thus, while the uneven wear resistance is favorably maintained, the drainage performance is effectively increased.

In the pneumatic tire, as shown in FIG. 2, each of the inclined grooves 31 has a profile line that makes an acute angle with an edge of the central land portion 30. The inclination angle of the profile line with respect to the tire circumferential direction gradually decreases from an opening end position P0 of the inclined groove 31 to at least a groove-length-direction central position P1 thereof. Moreover, each of the inclined grooves 21 has a profile line that makes an acute angle with an edge of the inner side-intermediate land portion 20. The inclination angle of the profile line with respect to the tire circumferential direction gradually decreases from an opening end position P0 of the inclined groove 21 to at least a groove-length-direction central position P1 thereof. Accordingly, water favorably flows therein, and a superb drainage performance is demonstrated.

An average inclination angle $\alpha$ of the profile line of the inclined groove 31 with respect to the tire circumferential direction is set within a range from 30° to 50°, the profile line making an acute angle with the edge of the central land portion 30. Moreover, an average inclination angle $\beta$ of the profile line of the inclined groove 21 with respect to the tire circumferential direction is set within a range from 20° to 40°, the profile line making an acute angle with the edge of the inner side-intermediate land portion 20. Here, the average inclination angles $\alpha$, $\beta$ are each an average inclination angle from the opening end position P0 of the corresponding inclined groove to the groove-length-direction central position P1 thereof. If the average inclination angles $\alpha$, $\beta$ are greater than the respective upper limit values, the resistance of water flowing in the grooves is increased, and the drainage performance is decreased. Meanwhile, if the average inclination angles $\alpha$, $\beta$ are smaller than the respective lower limit values, uneven wearing by chipping is more likely to occur near the opening ends. Additionally, the average inclination angle $\alpha$ of the inclined groove 31 and the average inclination angle $\beta$ of the inclined groove 21 satisfy a relationship of $\alpha > \beta$. When $\alpha > \beta$ is satisfied, the drainage performance is improved, while the rigidity of the central land portion 30 is guaranteed.

In FIG. 2, a shortest distance $\gamma1$ to the inclined groove 31 from the edge on the opposite side of the central land portion 30 to the edge where the inclined groove 31 is opened is preferably set within a range from 10% to 40% of a width W30 of the central land portion 30. A shortest distance $\gamma2$ to the inclined groove 21 from an edge on the opposite side of the inner side-intermediate land portion 20 to the edge where the inclined groove 21 is opened is preferably set within a range from 10% to 40% of a width W20 of the inner side-intermediate land portion 20. Accordingly, a good balance is achieved between the drainage performance and the uneven wear resistance. Here, if the shortest distances $\gamma1$, $\gamma2$ are smaller than the respective lower limit values, chipping is more likely to occur when a high lateral acceleration is generated as in circuit running. Meanwhile, if the shortest distances $\gamma1$, $\gamma2$ are greater than the respective upper limit values, it is difficult to guarantee the drainage performance.

As shown in FIG. 2, the multiple chamfered portions 33 are intermittently provided at the edge, on the outer side of the vehicle, of the central land portion 30. By providing such chamfered portions 33, the uneven wear resistance is improved. When a high lateral acceleration is generated as in circuit running, portions near the dead ends of the inclined grooves 31 in the central land portion 30 are deformed, resulting in a tendency that only the portions remain unworn because the portions do not come into contact with the ground. For this reason, the chamfered portions 33 are selectively provided at portions other than near the dead ends of the inclined grooves 31 in the central land portion 30, and thereby uneven wearing attributable to the inclined grooves 31 is suppressed.

A maximum width Wmax of the chamfered portion 33 is preferably set within a range from 10% to 30% of the width W30 of the central land portion 30. If the maximum width Wmax of the chamfered portion 33 is less than 10% of the width W30 of the central land portion 30, the effect of suppressing uneven wearing by the chamfered portion 33 is insufficient. Meanwhile, if the maximum width Wmax exceeds 30%, the rigidity of the central land portion 30 is considerably lowered, and consequently uneven wearing is more likely to occur.

A maximum depth Hmax of the chamfered portion 33 is preferably set to 10% or more of an effective depth D of the main groove 1c as shown in FIG. 4. The effective depth D of the main groove 1c is a depth from a road-contacting surface to a wear indicator 2 disposed on the main groove 1c. If the maximum depth Hmax of the chamfered portion 33 is less than 10% of the effective depth D of the main groove 1c, the effect of suppressing uneven wearing is insufficient.

The maximum width portion of the chamfered portion 33 is preferably disposed between the dead end of one of a pair of inclined grooves 31, 31 neighboring in the tire circumferential direction and the opening end of the other of the pair. Specifically, as shown in FIG. 2, a portion of the chamfered portion 33 with the maximum width Wmax is preferably disposed within a region X specified between the dead end of one of a pair of inclined grooves 31, 31 neighboring and the opening end of the other of the pair in the tire circumferential direction. Accordingly, uneven wearing is effectively suppressed.

The pneumatic tire has the rib structure that the outer side-intermediate land portion 40 positioned on the outer side of the vehicle relative to the central land portion 30 is continuous in the tire circumferential direction. Accordingly, the rib structure compensates the lowered rigidity of the land portions 20, 30 attributable to the inclined grooves 21, 31 provided to improve the drainage performance. Consequently, the cornering performance is improved.

Moreover, the multiple lug grooves 51 extending in the tire width direction are provided in the outer side-shoulder land portion 50 positioned on the outer side of the vehicle. These lug grooves 51 communicate with the main groove 1d adjacent to the outer side-shoulder land portion 50. Accordingly, the drainage capability of the main groove 1d adjacent to the outer side-shoulder land portion 50 is increased, and thereby the drainage performance of the entire tread is improved. Note that, the sipe 52 straddling a pair of the lug grooves 51, 51 contributes to prevention of uneven wearing in the outer side-shoulder land portion 50.

On the other hand, the multiple lug grooves 11 extending in the tire width direction are provided in the inner side-shoulder land portion 10 positioned on the inner side of the vehicle. These lug grooves 11 do not communicate with the main groove 1a adjacent to the inner side-shoulder land portion 10. Accordingly, uneven wearing in the inner side-shoulder land portion 10 is prevented.

Figure 5:
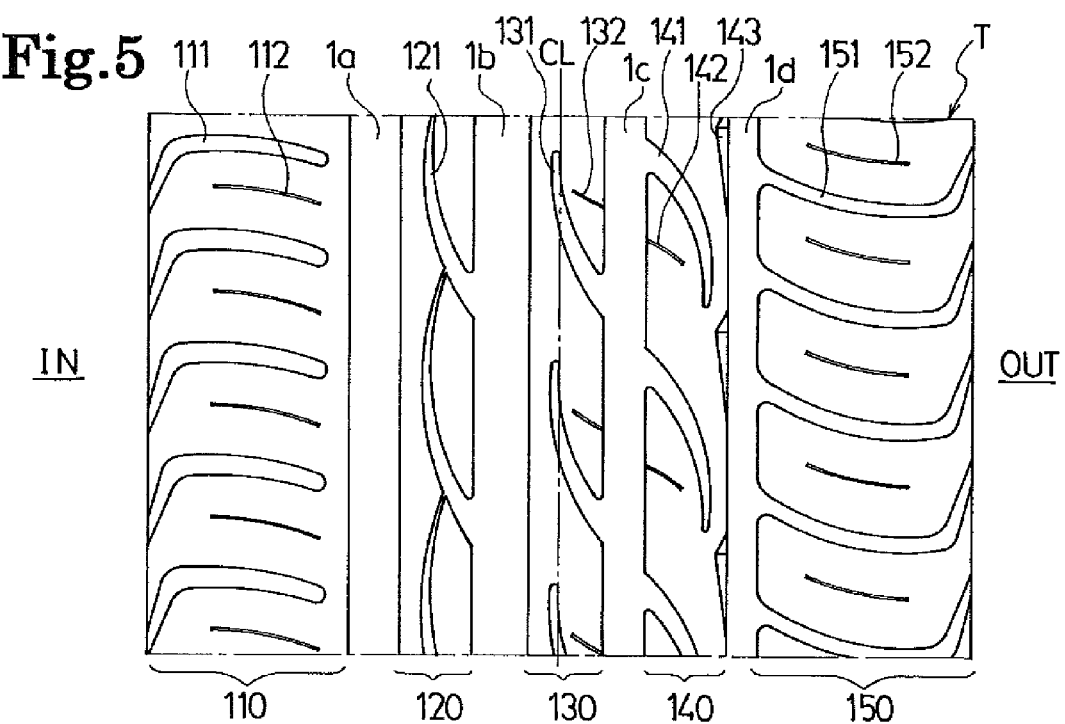
FIG. 5 is a developed view showing a tread pattern of a pneumatic tire in another embodiment of the present invention.
Figure 6:
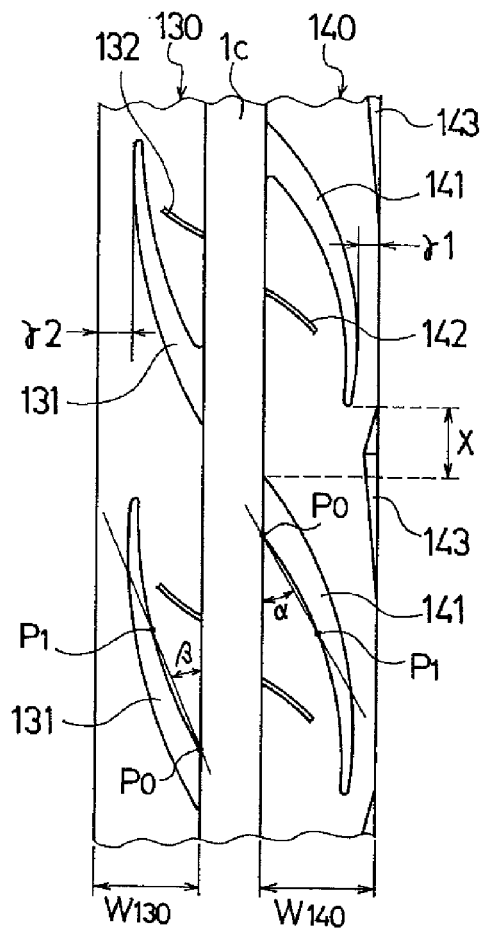
FIG. 6 is an enlarged plan view showing a central land portion and an outer side-intermediate land portion in FIG. 5.

FIG. 5 shows a tread pattern of a pneumatic tire in another embodiment of the present invention. FIG. 6 shows a central land portion and an outer side-intermediate land portion in FIG. 5. The pneumatic tire of this embodiment is designed to be mounted on a vehicle in a way that a designated side of the tire faces to an outside of the vehicle. The outer side of the vehicle is indicated by OUT, while the inner side of the vehicle is indicated by IN.

As shown in FIG. 5, four main grooves 1a, 1b, 1c, 1d are sequentially formed in a tread portion T from the inner side of the vehicle to the outer side of the vehicle, and extend in a tire circumferential direction. Five land portions 110, 120, 130, 140, 150 are defined by these main grooves 1a to 1d. Specifically, the inner side-shoulder land portion 110 is positioned in a shoulder region on the inner side of the vehicle; the inner side-intermediate land portion 120 is positioned between the main grooves 1a, 1b; the central land portion 130 is positioned on a tire equator line CL and between the main grooves 1b, 1c; the outer side-intermediate land portion 140 is positioned between the main grooves 1c, 1d; and the outer side-shoulder land portion 150 is positioned in a shoulder region on the outer side of the vehicle.

In the outer side-intermediate land portion 140, multiple inclined grooves 141 (first inclined grooves) inclined to the tire circumferential direction are formed at certain intervals in the tire circumferential direction. The inclined grooves 141 is opened at one end to the main groove 1c positioned between the central land portion 130 and the outer side-intermediate land portion 140, and is terminated at the other end in the outer side-intermediate land portion 140. The width of each inclined groove 141 may be uniform, but desirably the width becomes narrower toward the dead end as illustrated. Moreover, multiple sipes 142 communicating only with the main groove 1c are formed in the outer side-intermediate land portion 140. The inclined grooves 141 and the sipes 142 are alternately disposed along the tire circumferential direction. Furthermore, in the outer side-intermediate land portion 140, multiple chamfered portions 143 are formed at an edge on the outer side of the vehicle. Each of the chamfered portions 143 has a pair of inclined surfaces that forms a triangle. Each chamfered portion 143 is disposed in such a manner as to be positioned between a pair of the inclined grooves 141, 141 neighboring in the tire circumferential direction.

In the central land portion 130, multiple inclined grooves 131 (second inclined grooves) inclined in the same direction as that of the inclined grooves 141 are formed at certain intervals in the tire circumferential direction. Each of the inclined groove 131 is opened at one end to the main groove 1c positioned between the central land portion 130 and the outer side-intermediate land portion 140, and is terminated at the other end in the central land portion 130. The width of each inclined groove 131 may be uniform, but desirably the width becomes narrower toward the dead end as illustrated. Moreover, multiple sipes 132 communicating only with the main groove 1c is formed in the central land portion 130. The inclined grooves 131 and the sipes 132 are alternately disposed along the tire circumferential direction.

In the inner side-intermediate land portion 120, multiple inclined grooves 131 inclined in the same direction as that of the inclined grooves 131 are formed at certain intervals in the tire circumferential direction. Each of the inclined grooves 121 is opened at one end to the main groove 1b positioned between the central land portion 130 and the inner side-intermediate land portion 120, and is connected at the other end to the neighboring inclined groove 121. The width of each inclined groove 121 may be uniform, but desirably the width becomes narrower toward the dead end as illustrated.

In the inner side-shoulder land portion 110, multiple lug grooves 111 extending in a tire width direction and multiple sipes 112 extending in the tire width direction are formed. The lug grooves 111 and the sipes 112 are alternately disposed at certain intervals in the tire circumferential direction. None of the lug grooves 111 and the sipes 112 communicate with the main groove 1a adjacent to the inner side-shoulder land portion 110.

In the outer side-shoulder land portion 150, multiple lug grooves 151 extending in the tire width direction and multiple sipes 152 extending in the tire width direction are formed. The lug grooves 151 and the sipes 152 are alternately disposed at certain intervals in the tire circumferential direction. The lug grooves 151 communicate with the main groove 1d adjacent to the outer side-shoulder land portion 150, whereas none of the sipes 152 communicate with the main groove 1d.

In the pneumatic tire having the above-described tread pattern, the inclined grooves 141 having one end closed are provided in the outer side-intermediate land portion 140, while the inclined grooves 131 having one end closed and being inclined in the same direction as that of the inclined grooves 141 are provided in the central land portion 130. One end of each of these inclined grooves 131, 141 is opened to the common main groove 1c positioned between the central land portion 130 and the outer side-intermediate land portion 140. Accordingly, the drainage performance is effectively increased. Particularly, the inclined grooves 131 and the inclined grooves 141 are arranged in such a substantially point-symmetrical manner that the opening ends of the inclined grooves 131 face the opening ends of the inclined grooves 141. This enables the drainage capability based on the main groove 1c to increase. Moreover, since the inclined grooves 131, 141 do not cut across the land portions 130, 140, the uneven wear resistance is also superb. Thus, while the uneven wear resistance is favorably maintained, the drainage performance is effectively increased.

In the pneumatic tire, as shown in FIG. 6, each of the inclined grooves 141 has a profile line that makes an acute angle with an edge of the outer side-intermediate land portion 140. The inclination angle of the profile line with respect to the tire circumferential direction gradually decreases from an opening end position P0 of the inclined groove 141 to at least a groove-length-direction central position P1 thereof. Moreover, each of the inclined grooves 131 has a profile line that makes an acute angle with an edge of the central land portion 130. The inclination angle of the profile line with respect to the tire circumferential direction gradually decreases from an opening end position P0 of the inclined groove 131 to at least a groove-length-direction central position P1 thereof. Accordingly, water favorably flows therein, and a superb drainage performance is demonstrated.

An average inclination angle α of the profile line of the inclined groove 141 with respect to the tire circumferential direction is set within a range from 30° to 50°, the profile line making an acute angle with the edge of the outer side-intermediate land portion 140. Moreover, an average inclination angle β of the profile line of the inclined groove 131 with respect to the tire circumferential direction is set within a range from 20° to 40°, the profile line making an acute angle with the edge of the central land portion 130. Here, the average inclination angles α, β are each an average inclination angle from the opening end position P0 of the corresponding inclined groove to the groove-length-direction central position P1 thereof. If the average inclination angles α, β are greater than the respective upper limit values, the resistance of water flowing in the grooves is increased, and the drainage performance is decreased. Meanwhile, if the average inclination angles α, β are smaller than the respective lower limit values, uneven wearing by chipping is more likely to occur near the opening ends.

In FIG. 6, a shortest distance γ1 to the inclined groove 141 from the edge on the opposite side of the outer side-intermediate land portion 140 to the edge where the inclined groove 141 is opened is preferably set within a range from 10% to 40% of a width W140 of the outer side-intermediate land portion 140. A shortest distance γ2 to the inclined groove 131 from an edge on the opposite side of the central land portion 130 to the edge where the inclined groove 131 is opened is preferably set within a range from 10% to 40% of a width W130 of the central land portion 130. Accordingly, a good balance is achieved between the drainage performance and the uneven wear resistance. Here, if the shortest distances γ1, γ2 are smaller than the respective lower limit values, chipping is more likely to occur when a high lateral acceleration is generated as in circuit running. Meanwhile, if the shortest distances γ1, γ2 are greater than the respective upper limit values, it is difficult to guarantee the drainage performance.

As shown in FIG. 6, the multiple chamfered portions 143 are intermittently provided at the edge, on the outer side of the vehicle, of the outer side-intermediate land portion 140. By providing such chamfered portions 143, the uneven wear resistance is improved. When a high lateral acceleration is generated as in circuit running, portions near the dead ends of the inclined grooves 141 in the outer side-intermediate land portion 140 are deformed, resulting in a tendency that only the portions remain unworn because the portions do not come into contact with the ground. For this reason, the chamfered portions 143 are selectively provided at portions other than near the dead ends of the inclined grooves 141 in the outer side-intermediate land portion 140, and thereby uneven wearing attributable to the inclined grooves 141 is suppressed.

The maximum width of the chamfered portion 143 is preferably set within a range from 10% to 30% of the width W140 of the outer side-intermediate land portion 140 for the same reasons as described above. Moreover, the maximum depth of the chamfered portion 143 is preferably set to 10% or more of the effective depth of the main groove 1d for the same reasons as described above. The maximum width portion of the chamfered portion 143 is preferably disposed between the dead end of one of a pair of the inclined grooves 141, 141 neighboring in the tire circumferential direction and the opening end of the other of the pair for the same reasons as described above.

Specifically, as shown in FIG. 6, a portion of the chamfered portion 143 with the maximum width is preferably disposed within a region X specified between the dead end of one of a pair of the inclined grooves 141, 141 neighboring and the opening end of the other of the pair in the tire circumferential direction.

Moreover, the multiple lug grooves 151 extending in the tire width direction are provided in the outer side-shoulder land portion 150 positioned on the outer side of the vehicle. These lug grooves 151 communicate with the main groove 1d adjacent to the outer side-shoulder land portion 150. Accordingly, the drainage capability of the main groove 1d adjacent to the outer side-shoulder land portion 150 is increased, and thereby the drainage performance of the entire tread is improved.

On the other hand, the multiple lug grooves 111 extending in the tire width direction are provided in the inner side-shoulder land portion 110 positioned on the inner side of the vehicle. These lug grooves 111 do not communicate with the main groove 1a adjacent to the inner side-shoulder land portion 110. Accordingly, uneven wearing in the inner side-shoulder land portion 110 is prevented.

Figure 7:
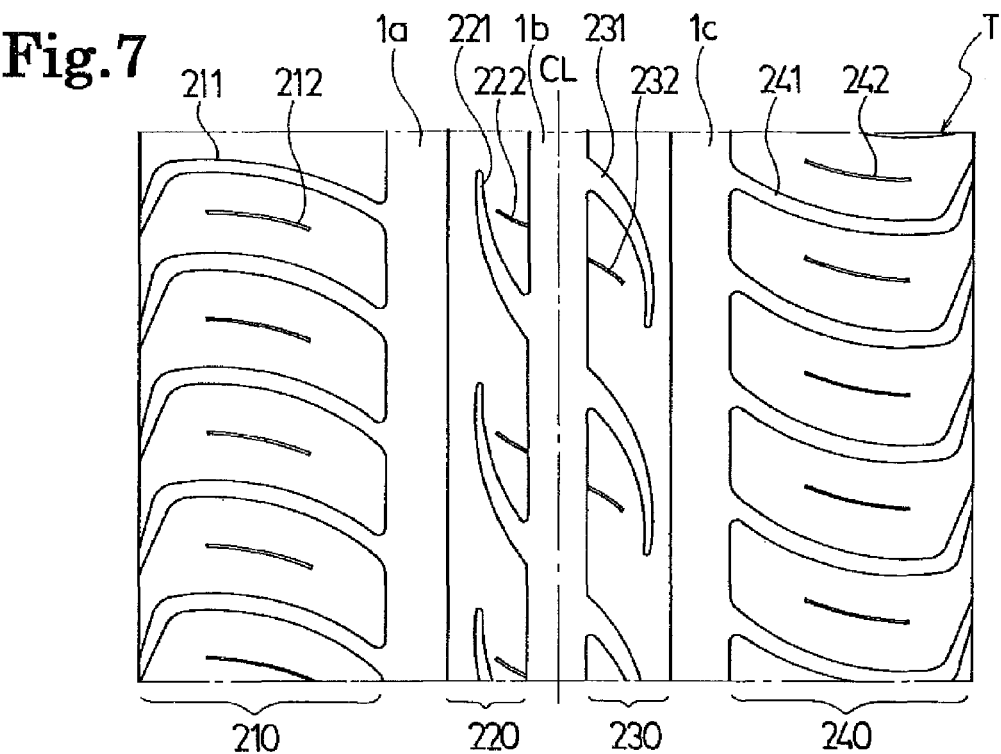
FIG. 7 is a developed view showing a tread pattern of a pneumatic tire in still another embodiment of the present invention.
Figure 8:
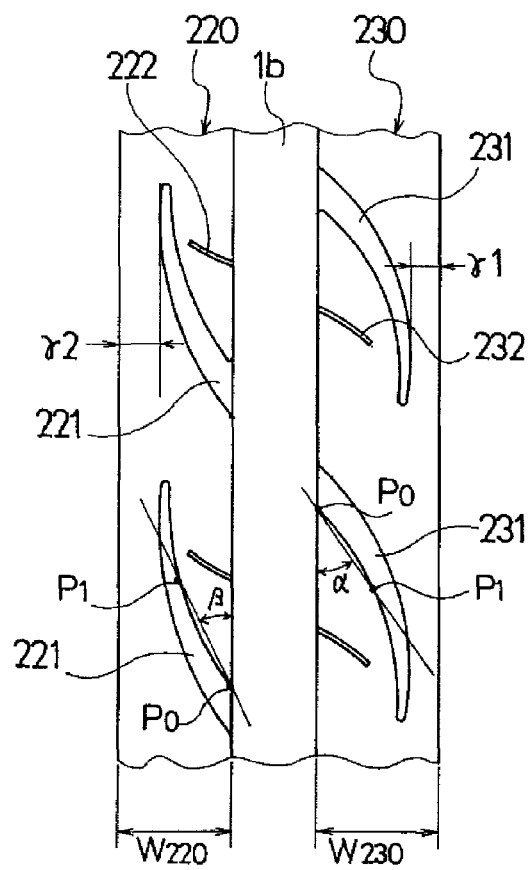
FIG. 8 is an enlarged plan view showing a pair of central land portions in FIG. 7.

FIG. 7 shows a tread pattern of a pneumatic tire in still another embodiment of the present invention. FIG. 8 shows a pair of central land portions in FIG. 7. The pneumatic tire of this embodiment is not designed to be mounted on a vehicle in away that a designated side of the tire faces to an outside of the vehicle.

As shown in FIG. 7, three main grooves 1a, 1b, 1c extending in a tire circumferential direction are formed in a tread portion T. Four land portions 210, 220, 230, 240 are defined by these main grooves 1a to 1c. Specifically, the paired shoulder land portions 210, 240 are positioned in shoulder regions, respectively, and the paired central land portions 220, 230 are respectively positioned at both sides of a tire equator line CL.

In the central land portion 230, multiple inclined grooves 231 (first inclined grooves) inclined to the tire circumferential direction are formed at certain intervals in the tire circumferential direction. Each of the inclined grooves 231 is opened at one end to the main groove 1b positioned between the central land portions 220, 230, and is terminated at the other end in the central land portion 230. The width of each inclined groove 231 may be uniform, but desirably the width becomes narrower toward the dead end as illustrated. Moreover, multiple sipes 232 communicating only with the main groove 1b are formed in the central land portion 230. The inclined grooves 231 and the sipes 232 are alternately disposed along the tire circumferential direction.

In the central land portion 220, multiple inclined grooves 221 (second inclined grooves) inclined in the same direction as that of the inclined grooves 231 are formed at certain intervals in the tire circumferential direction. Each of the inclined grooves 221 is opened at one end to the main groove 1b positioned between the central land portions 220, 230, and is terminated at the other end in the central land portion 220. The width of each inclined groove 221 may be uniform, but desirably the width becomes narrower toward the dead end as illustrated. Moreover, multiple sipes 222 communicating only with the main groove 1b are formed in the central land portion 220. The inclined grooves 221 and the sipes 222 are alternately disposed along the tire circumferential direction.

In the shoulder land portion 210, multiple lug grooves 211 extending in a tire width direction and multiple sipes 212 extending in the tire width direction are formed. The lug grooves 211 and the sipes 212 are alternately disposed at certain intervals in the tire circumferential direction. The lug grooves 211 communicate with the main groove 1a adjacent to the shoulder land portion 210, whereas the sipes 212 do not communicate with the main groove 1a.

In the shoulder land portion 240, multiple lug grooves 241 extending in the tire width direction and multiple sipes 242 extending in the tire width direction are formed. The lug grooves 241 and the sipes 242 are alternately disposed at certain intervals in the tire circumferential direction. The lug grooves 241 communicate with the main groove 1c adjacent to the shoulder land portion 240, whereas the sipes 242 do not communicate with the main groove 1c.

In the pneumatic tire having the above-described tread pattern, the inclined grooves 231 having one end closed are provided in the central land portion 230, while the inclined grooves 221 having one end closed and being inclined in the same direction as that of the inclined grooves 231 are provided in the central land portion 220. One end of each of these inclined grooves 221, 231 is opened to the common main groove 1b positioned between the central land portions 220, 230. Accordingly, the drainage performance is effectively increased. Particularly, the inclined grooves 221 and the inclined grooves 231 are arranged in such a substantially point-symmetrical manner that the opening ends of the inclined grooves 221 face the opening ends of the inclined grooves 231. This enables the drainage capability based on the main groove 1b to increase. Moreover, since the inclined grooves 221, 231 do not cut across the land portions 220, 230, the uneven wear resistance is also superb. Thus, while the uneven wear resistance is favorably maintained, the drainage performance is effectively increased.

In the pneumatic tire, as shown in FIG. 8, each of the inclined grooves 231 has a profile line that makes an acute angle with an edge of the central land portion 230. The inclination angle of the profile line with respect to the tire circumferential direction gradually decreases from an opening end position P0 of the inclined groove 231 to at least a groove-length-direction central position P1 thereof. Moreover, each of the inclined grooves 221 has a profile line that makes an acute angle with an edge of the central land portion 220. The inclination angle of the profile line with respect to the tire circumferential direction gradually decreases from an opening end position P0 of the inclined groove 221 to at least a groove-length-direction central position P1 thereof. Accordingly, water favorably flows therein, and a superb drainage performance is demonstrated.

An average inclination angle α of the profile line of the inclined groove 231 with respect to the tire circumferential direction is set within a range from 20° to 50°, the profile line making an acute angle with the edge of the central land portion 230. Moreover, an average inclination angle β of the profile line of the inclined groove 221 with respect to the tire circumferential direction is set within a range from 20° to 50°, the profile line making an acute angle with the edge of the central land portion 220. Here, the average inclination angles α, β are each an average inclination angle from the opening end position P0 of the corresponding inclined groove to the groove-length-direction central position P1 thereof. If the average inclination angles α, β are greater than the respective upper limit values, the resistance of water flowing in the grooves is increased, and the drainage performance is decreased. Meanwhile, if the average inclination angles α, β are smaller than the respective lower limit values, uneven wearing by chipping is more likely to occur near the opening ends.

In FIG. 8, a shortest distance γ1 to the inclined groove 231 from an edge on the opposite side of the central land portion 230 to the edge where the inclined groove 231 is opened is preferably set within a range from 10% to 40% of a width W230 of the central land portion 230. A shortest distance γ2 to the inclined groove 221 from an edge on the opposite side of the central land portion 220 to the edge where the inclined groove 221 is opened is preferably set within a range from 10% to 40% of a width W220 of the central land portion 220. Accordingly, a good balance is achieved between the drainage performance and the uneven wear resistance. Here, if the shortest distances γ1, γ2 are smaller than the respective lower limit values, chipping is more likely to occur when a high lateral acceleration is generated as in circuit running. Meanwhile, if the shortest distances γ1, γ2 are greater than the respective upper limit values, it is difficult to guarantee the drainage performance.

Note that, the central land portions 220, 230 being provided respectively with the inclined grooves 221, 231 may be provided with multiple chamfered portions at the edges on the opposite sides to the sides where the inclined grooves 221, 231 are opened, respectively. As the chamfered portions, ones having the same shape as that in other embodiments can be adopted. By providing such chamfered portions, the uneven wear resistance is improved.

Hereinabove, the preferable embodiments of the present invention have been described specifically. However, it should be understood that various changes, substitutions, and alternations can be made therein without departing from the spirit and scope of the present invention defined by the appended claims.

EXAMPLES

Prepared were tires of Examples 1 to 7 having a tire size of 205/55R16, which were each a pneumatic tire having an asymmetrical tread pattern with respect to both sides of a tire equator line, and designed to be mounted on a vehicle in a way that a designated side of the tire faces to an outside of the vehicle. Specifically, as shown in FIG. 1, four main grooves extending in a tire circumferential direction were provided in a tread portion. Five land portions are defined by these main grooves. Multiple first inclined grooves inclined to the tire circumferential direction were provided in a central land portion positioned on the tire equator line. Multiple second inclined grooves inclined in the same direction as that of the first inclined grooves were provided in an inner side-intermediate land portion positioned on the inner side of the vehicle relative to the central land portion. Each of the first inclined grooves was opened at one end to the main groove positioned between the central land portion and the inner side-intermediate land portion, and was terminated at the other end in the central land portion. Each of the second inclined grooves was opened at one end to the main groove positioned between the central land portion and the inner side-intermediate land portion, and was terminated at the other end in the inner side-intermediate land portion. Multiple chamfered portions were provided at an edge, on the outer side of the vehicle, of the central land portion. Each of the tires of Examples 1 to 7 was set to have: an average inclination angle α of the first inclined groove; an average inclination angle β of the second inclined groove; a ratio of a maximum width Wmax of the chamfered portion to the width of the central land portion; and a ratio of a maximum depth Hmax of the chamfered portion to the effective depth of the main groove as shown in Table 1. For comparison, prepared was a pneumatic tire (Conventional Example 1) in which inclined grooves were provided in each of the inner side-intermediate land portion and the outer side-intermediate land portion, and in which each of the inclined grooves was opened at one end to the main groove on a shoulder side, and was terminated at the other end in the corresponding land portion.

The drainage performance and the uneven wear resistance of these tires were evaluated according to the following evaluation methods. Table 1 shows the results.

Drainage Performance:

Each of the test tires was fitted onto a wheel having a rim size of 16×6.5 J and inflated to an air pressure of 230 kPa. The test tire was mounted on a passenger vehicle with a displacement of 1800 cc. The vehicle was driven drawing a circle of 100 m radius. The maximum lateral acceleration was measured when the vehicle passed through a pool with a water depth of 5 mm provided on the circular course. The evaluation results were expressed by indices where Conventional Example 1 was taken as 100. A large index value means a superb drainage performance.

Uneven Wear Resistance:

Each of the test tires was fitted onto a wheel having a rim size of 16×6.5 J and inflated to an air pressure of 230 kPa. The test tire was mounted on a passenger vehicle with a displacement of 1800 cc. The vehicle was driven on a dry course surface of a 2 km circuit for 10 laps. The state of uneven wear occurred at the tread surface was visually observed, and the uneven wear resistance was evaluated by a five-point method where Conventional Example 1 was used as a reference (3). In the evaluation result, a higher point means a superb uneven wear resistance.

outside of the vehicle. Specifically, as shown in FIG. 5, four main grooves extending in a tire circumferential direction were provided in a tread portion. Five land portions are defined by these main grooves. Multiple first inclined grooves inclined to the tire circumferential direction were provided in an outer side-intermediate land portion positioned on the outer side of the vehicle relative to a central land portion. Multiple second inclined grooves inclined in the same direction as that of the first inclined grooves were provided in the central land portion positioned on the tire equator line. Each of the first inclined grooves was opened at one end to the main groove positioned between the central land portion and the outer side-intermediate land portion, and was terminated at the other end in the outer side-intermediate land portion. Each of the second inclined grooves was opened at one end to the main groove positioned between the central land portion and the outer side-intermediate land portion, and was terminated at the other end in the central land portion. Multiple chamfered portions were provided at an edge, on the outer side of the vehicle, of the outer side-intermediate land portion. Each of the tires of Examples 11 to 17 was set to have: an average inclination angle $\alpha$ of the first inclined groove; an average inclination angle $\beta$ of the second inclined groove; a ratio of a maximum width Wmax of the chamfered portion to the width of the outer side-intermediate land portion; and a ratio of a maximum depth Hmax of the chamfered portion to the effective depth of the main groove as shown in Table 2. For comparison, prepared was a pneumatic tire (Conventional

TABLE 1

|  | Conventional Example 1 | Example 1 | Example 2 | Example 3 | Example 4 | Example 5 | Example 6 | Example 7 |
|---|---|---|---|---|---|---|---|---|
| Inclination angle $\alpha$ of first inclined groove (°) | (30) | 40 | 40 | 40 | 40 | 50 | 30 | 60 |
| Inclination angle $\beta$ of second inclined groove (°) | (30) | 30 | 30 | 30 | 30 | 40 | 20 | 50 |
| Maximum width Wmax of chamfered portion (%) | — | 20 | 10 | 30 | 5 | 20 | 20 | 20 |
| Maximum depth Hmax of chamfered portion (%) | — | 50 | 50 | 50 | 5 | 50 | 50 | 50 |
| Drainage performance | 100 | 109 | 109 | 109 | 109 | 105 | 107 | 102 |
| Uneven wear resistance | 3 | 5 | 4 | 4 | 3 | 5 | 5 | 5 |

As apparent from Table 1, the tires of Examples 1 to 7 had the improved drainage performance in comparison with Conventional Example 1 while maintaining the uneven wear resistance equivalent or superior to that of Conventional Example 1.

Next, prepared were tires of Examples 11 to 17 having a tire size of 205/55R16, which were each a pneumatic tire having an asymmetrical tread pattern with respect to both sides of a tire equator line, and designed to be mounted on a vehicle in a way that a designated side of the tire faces to an Example 2) in which inclined grooves were provided in each of the inner side-intermediate land portion and the outer side-intermediate land portion, and in which each of the inclined grooves was opened at one end to the main groove on a shoulder side, and was terminated at the other end in the corresponding land portion.

The drainage performance and the uneven wear resistance of these tires were evaluated according to the same evaluation methods described above. Table 2 shows the results. Note that the reference of the evaluation was Conventional Example 2.

TABLE 2

|  | Conventional Example 2 | Example 11 | Example 12 | Example 13 | Example 14 | Example 15 | Example 16 | Example 17 |
|---|---|---|---|---|---|---|---|---|
| Inclination angle $\alpha$ of first inclined groove (°) | (30) | 40 | 40 | 40 | 40 | 50 | 30 | 60 |
| Inclination angle $\beta$ of second inclined groove (°) | (30) | 30 | 30 | 30 | 30 | 40 | 20 | 50 |

TABLE 2-continued

|  | Conventional Example 2 | Example 11 | Example 12 | Example 13 | Example 14 | Example 15 | Example 16 | Example 17 |
|---|---|---|---|---|---|---|---|---|
| Maximum width Wmax of chamfered portion (%) | — | 20 | 10 | 30 | 5 | 20 | 20 | 20 |
| Maximum depth Hmax of chamfered portion (%) | — | 50 | 50 | 50 | 5 | 50 | 50 | 50 |
| Drainage performance | 100 | 107 | 107 | 107 | 107 | 103 | 105 | 102 |
| Uneven wear resistance | 3 | 5 | 4 | 4 | 3 | 5 | 5 | 5 |

As apparent from Table 2, the tires of Examples 11 to 17 had the improved drainage performance in comparison with Conventional Example 2 while maintaining the uneven wear resistance equivalent or superior to that of Conventional Example 2.

Next, prepared were tires of Examples 21 to 24 having a tire size of 205/55R16, which were each a pneumatic tire including a tread portion provided with three main grooves extending in a tire circumferential direction, these main grooves defining four land portions, as shown in FIG. 7. Specifically, multiple first inclined grooves inclined to the tire circumferential direction were provided in one central land portion of a pair of central land portions positioned respectively at both sides of the main groove on a tire equator line. Multiple second inclined grooves inclined in the same direction as that of the first inclined grooves were provided in the other central land portion of the pair of central land portions. Each of the first inclined grooves was opened at one end to the main groove positioned between the pair of central land portions, and was terminated at the other end in the one central land portion. Each of the second inclined grooves was opened at one end to the main groove positioned between the pair of central land portions, and was terminated at the other end in the other central land portion. Each of the tires of Examples 21 to 24 was set to have: an average inclination angle α of the first inclined groove; and an average inclination angle β of the second inclined groove as shown in Table 3. For comparison, prepared was a pneumatic tire (Conventional Example 3) in which inclined grooves were provided in each of paired central land portions, and in which each of the inclined grooves was opened at one end to the main groove on a shoulder side, and was terminated at the other end in the corresponding land portion.

The drainage performance and the uneven wear resistance of these tires were evaluated according to the same evaluation methods described above. Table 3 shows the results. Note that the reference of the evaluation was Conventional Example 3.

TABLE 3

|  | Conventional Example 3 | Example 21 | Example 22 | Example 23 | Example 24 |
|---|---|---|---|---|---|
| Inclination angle α of first inclined groove (°) | (30) | 40 | 50 | 30 | 60 |
| Inclination angle β of second inclined groove (°) | (30) | 30 | 40 | 20 | 50 |
| Drainage performance | 100 | 108 | 104 | 106 | 102 |
| Uneven wear resistance | 3 | 3 | 3 | 3 | 3 |

As apparent from Table 3, the tires of Examples 21 to 24 had the improved drainage performance in comparison with Conventional Example 3 while maintaining the uneven wear resistance equivalent or superior to that of Conventional Example 3.

EXPLANATION OF REFERENCE NUMERALS

| 1a, 1b, 1c, 1d | main groove |
|---|---|
| 10, 20, 30, 40, 50 | land portion |
| 11, 51 | lug groove |
| 12, 22, 32, 52 | sipe |
| 21, 31 | inclined groove |
| 41 | sub groove |
| T | tread portion |

What is claimed is:

1. A pneumatic tire having an asymmetrical tread pattern with respect to both sides of a tire equator line, and designed to be mounted on a vehicle in a way that a designated outer side of the tire faces to an outside of the vehicle, the tire also having a designated inner side provided opposite the outer side, the pneumatic tire characterized in that:

at least four main grooves extending in a tire circumferential direction are provided in a tread portion, a plurality of land portions are defined by these main grooves, a plurality of first inclined grooves inclined to the tire circumferential direction are provided in a central land portion positioned on the tire equator line, a plurality of second inclined grooves inclined in a same direction as that of the first inclined grooves are provided in an inner side-intermediate land portion positioned on an inner side of the tire relative to the central land portion, a plurality of lug grooves extending in the tire width direction are provided in an outer side-shoulder land portion on the outer side of the tire, and these lug grooves communicate with one of said main grooves adjacent to the outer side-shoulder land portion;

each of the first inclined grooves is opened at one end to the main groove positioned between the central land portion and the inner side-intermediate land portion, and is terminated at the other end in the central land portion, each of the second inclined grooves is opened at one end to the main groove positioned between the central land portion and the inner side-intermediate land portion, and is terminated at the other end in the inner side-intermediate land portion, a plurality of sipes are formed in the central land portion and in the inner side-intermediate land portion, respectively, and the inclined grooves and sipes, which communicate only with the main groove positioned between the central land portion and the inner side-intermediate land portion, are alternately disposed in the tire circumferential direction.

2. The pneumatic tire according to claim 1, characterized in that an average inclination angle $\alpha$ of a profile line of the first inclined groove with respect to the tire circumferential direction is 30° to 50°, the profile line making an acute angle with an edge of the central land portion, and an average inclination angle $\beta$ of a profile line of the second inclined groove with respect to the tire circumferential direction is 20° to 40°, the profile line making an acute angle with an edge of the inner side-intermediate land portion.

3. The pneumatic tire according to claim 2, characterized in that the average inclination angle $\alpha$ of the profile line of the first inclined groove with respect to the tire circumferential direction and the average inclination angle $\beta$ of the profile line of the second inclined groove with respect to the tire circumferential direction have a relationship of $\alpha > \beta$, the profile line of the first inclined groove making an acute angle with the edge of the central land portion, the profile line of the second inclined groove making an acute angle with the edge of the inner side-intermediate land portion.

4. The pneumatic tire according to claim 1, characterized in that an inclination angle of the profile line of the first inclined groove with respect to the tire circumferential direction gradually decreases from an opening end of the first inclined groove to at least a central position therein in a groove length direction, the profile line making an acute angle with the edge of the central land portion, and an inclination angle of the profile line of the second inclined groove with respect to the tire circumferential direction gradually decreases from an opening end of the second inclined groove to at least a central position therein in a groove length direction, the profile line making an acute angle with the edge of the inner side-intermediate land portion.

5. The pneumatic tire according to claim 1, characterized in that a shortest distance $\gamma 1$ to the first inclined groove from an edge on an opposite side of the central land portion to the edge where the first inclined groove is opened is 10% to 40% of a width of the central land portion, and a shortest distance $\gamma 2$ to the second inclined groove from an edge on an opposite side of the inner side-intermediate land portion to the edge where the second inclined groove is opened is 10% to 40% of a width of the inner side-intermediate land portion.

6. The pneumatic tire according to claim 1, characterized in that a plurality of chamfered portions are provided at the edge, at the outer side of the tire, of the central land portion.

7. The pneumatic tire according to claim 6, characterized in that a maximum width of each of the chamfered portions is 10% to 30% of the width of the central land portion.

8. The pneumatic tire according to claim 6, characterized in that a maximum depth of the chamfered portion is 10% or more of an effective depth from a road-contacting surface to a wear indicator of the main groove.

9. The pneumatic tire according to claim 6, characterized in that a maximum width portion of the chamfered portion is disposed between a dead end of one of a pair of the first inclined grooves neighboring in the tire circumferential direction and an opening end of the other of the pair.

10. The pneumatic tire according to claim 1, characterized in that an outer side-intermediate land portion positioned on the outer side of the tire relative to the central land portion has a rib structure in which the outer side-intermediate land portion is continuous in the tire circumferential direction.

11. The pneumatic tire according to claim 2, characterized in that a plurality of lug grooves extending in the tire width direction are provided in an inner side-shoulder land portion positioned on the inner side of the tire, and these lug grooves do not communicate with the main groove adjacent to the inner side-shoulder land portion.

* * * * *